Figure 1:
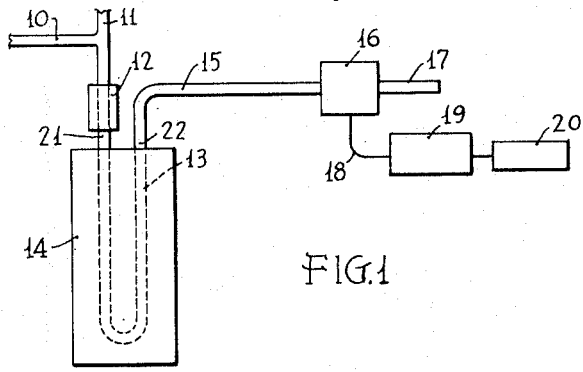

Feb. 25, 1964 M. F. DOBBINS 3,122,014
CHROMATOGRAPHY COLUMN ENCLOSURE
Filed July 5, 1961

INVENTOR
Murrell F. Dobbins
BY Karl L. Schiff
AGENT

United States Patent Office 3,122,014
Patented Feb. 25, 1964

3,122,014
CHROMATOGRAPHY COLUMN ENCLOSURE
Murrell R. Dobbins, 2352 Fairhill Ave., Glenside, Pa.
Filed July 5, 1961, Ser. No. 121,380
4 Claims. (Cl. 73—23)

The invention relates to enclosures or compartments for the so-called column of gas chromatography devices, instruments or systems and its objects are important improvements in such enclosures so as to improve the performance of the column and of the entire chromatography system.

The understanding of the problems encountered and the appreciation of the significance of the invention may be facilitated by a brief outline of what chromatography is.

Chromatography is a system of analyzing the components of complex mixtures of closely related chemical compounds. In gas chromatography a test sample is injected into a carrier gas stream. This stream is flash-heated so as to vaporize the sample and then directed through a column, where the sample separation occurs by adsorption; after leaving the column, the gas stream reaches the so-called detector where the gas is ionized and the detector acts as diode, the current impulses being amplified and recorded, the recording revealing the composition of the test sample.

The column proper is merely a tube bent into U or W form or in the shape of a prismatic spiral. This tube may have a very small diameter and consists of a suitable material, e.g. glass, stainless steel or the like.

So as to get accurate readings and so as to be able to correctly interpret the recording supplied by the device, it is absolutely necessary that the column be kept at a constant temperature over its entire length at any given moment. This does not necessarily mean that the column during the entire examination is kept at one temperature; to the contrary, the column may be slowly heated or slowly cooled off. This heating or cooling should however extend uniformly over the entire length of the column so that at any given moment all parts of the sample carrying gas stream within the column have the same temperature.

Many attempts have been made and many devices have actually been built which are to solve this problem of the temperature. Some of the known solutions are very expensive and complicated while others do not give satisfactory results.

Among the more specific objects of the invention is such formation and arrangement of a column and of a compartment or enclosure therefor that the temperature problem is solved with simple means, i.e. so that the temperature is efficiently kept constant over the entire length of the column.

An outstanding feature of the invention consists therein that the column proper is housed in an inner enclosure, a casing, compartment or the like, that this enclosure is surrounded by a coil for air or another suitable gaseous heat-transfer medium, that this coil has an inlet near one end and an outlet near the other end of the enclosure, said outlet communicating with the interior of the enclosure at or near said other end thereof, and the enclosure having a discharge opening at or near its first named end. The coil and casing are on their part housed in an outer enclosure, casing, compartment or the like, which later is preferably effectively thermally insulated or consists of insulating material.

The aforesaid and further objects, advantages, features and details of the invention will be more clearly understood from the illustration in the attached drawing and the following description of an embodiment of the invention.

Figure 2:
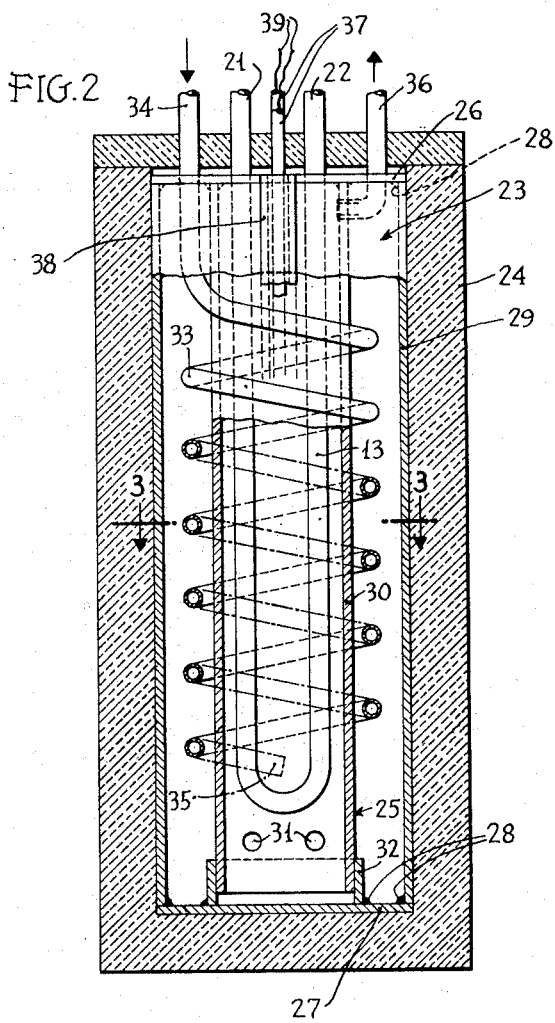

In the drawing:
FIG. 1 is a highly diagrammatic outlay of a chromatography installation;
FIG. 2 is a longitudinal section of the device constituting the invention; and
FIG. 3 is a cross-section along line 3—3 of FIG. 2.

The chromatography system shown in FIG. 1 comprises an inlet 10 for an inert carrier gas, a port 11 for the injection of the sample to be tested, a flash heater 12, a column 13, an enclosure 14 for the column 13, a conduit 15 from column 13 to a detector 16, a gas discharge tube 17, wiring 18 leading from the detector 16 to a sensing device 19, and a recorder 20. The purpose and operation of this well-known system and of its components have been explained hereinbefore and should not require repetition.

Figure 3:
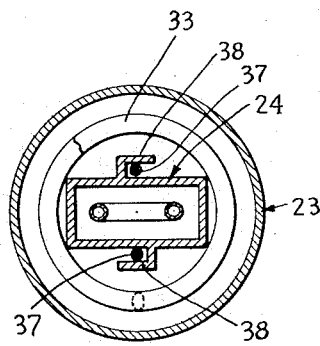

The invention proper is illustrated by means of FIGS. 2 and 3. Column 13 has an inlet 21 and an outlet 22. The enclosure 14 for the column 13 comprises an outer casing 23, e.g. of metal, with a thermally insulating cover 24, and an inner casing 25. The two casings 23/25 have common end walls 26/27. The upper end wall 26 is rigidly secured, such as by welds 28, to the prismatic walls 29/30 of the two casings whereas the open lower end of inner casing 25 ends short of lower end wall 27 which latter is secured, such as again by welds 28, to the circumferential wall 29 of the outer casing. Walls 29/30 are spaced from each other and the space between them communicates with the interior of inner casing 25 such as through holes 31 provided in casing wall 30. An upstanding wall 32 is secured to end wall 27 and telescopingly engages the lower end of inner casing 25 so as to accommodate differences in thermal expansion of the two casings 23/25.

A tube 33 is coiled in a spiral around the circumferential wall 30 of the inner casing. Its inlet 34 extends through the upper end wall 26 and its outlet 35 is located within the space between the two casings 23/25 near the lower end thereof. Inlet 34 is adapted for connection to a, not shown, source of gaseous medium under suitable pressure so as to cause it to flow through coil 33 and be discharged from the latter's outlet 35. The interior of inner casing 25 communicates near its uper end, i.e. the end remote from the outlet of coil 33, through an opening or tube 36 with the outside.

As is self-evident, a gaseous medium entering at 34 will pass downwardly through coil 33 along inner casing 25, will be discharged at 35, will enter the interior of inner casing 25 through openings 31, rise upwardly in the interior of inner casing 25, and will be discharged at 36 to the outside. This flow of the gaseous medium in opposite directions is responsible for maintaining uniform temperature for column 13 because any temperature differences between the entry at 34 and the discharge at 36 compensate each other.

The gaseous medium may be used not only for keeping a given temperature but also for uniformly lowering or raising it by means of suitable heating or cooling devices (not shown) for the gaseous medium before its entry into the enclosure.

Besides, heating elements 37 may be provided in pockets 38 along inner casing 25 and fed through wires 39 from a, not shown, current source.

The invention is not restricted to the illustrated embodiment or to details thereof but is susceptible to modifications and adaptations.

What is claimed is:
1. Chromatography column enclosure comprising a casing for housing said column and a tube coiled around said casing, said coiled tube having an inlet provided at or near one end of said casing and adapted for connection to a source of a gaseous thermal transfer medium, said coiled tube having an outlet communicating with the in- terior of said casing near the other end of the latter, and a passage establishing communications between the interior of said casing at or near its said one end and the outside.

2. Chromatography column enclosure according to claim 1, in which the aforesaid casing is an inner casing, an outer casing surrounding said inner casing, and said coiled tube being arranged in the space between said outer casing and said inner casing.

3. Chromatography column enclosure according to claim 2, in which said coiled tube has an outlet in the space between said outer casing and said inner casing and in which a passage for said gaseous medium is provided between said space and the interior of said inner casing at or near said other end of the latter.

4. Chromatography column enclosure according to claim 2, in which said outer and inner casings have end walls in common and in which the inner casing is free of a rigid connection with the end wall at its said other end.

References Cited in the file of this patent
UNITED STATES PATENTS
1,487,353    Nolte _____ Mar. 18, 1924

OTHER REFERENCES

Analytical Chemistry article "Versatile Gas-Liquid Partition Chromatography Apparatus" by G. K. Ashbury et al.; vol. 29, No. 6, June 1957, pp. 918–925.